3,041,373
RESOLUTION OF MIXTURES CONTAINING
ACETIC ACID AND FORMIC ACID
Lucas Alders and Gerhard G. Baijlé, Amsterdam, Netherlands, assignors to Shell Oil Company, a corporation of Delaware
No Drawing. Filed Apr. 13, 1959, Ser. No. 805,685
Claims priority, application Netherlands Apr. 18, 1958
3 Claims. (Cl. 260—541)

This invention relates to the separation of acetic acid from mixtures containing acetic acid in admixture with formic acid. The invention relates more particularly to the separation of acetic acid free of any substantial amount of formic acid from mixtures containing both acetic and formic acids by extraction with an aromatic hydrocarbon solvent in the presence of an aqueous solvent.

Mixtures containing acetic acid in admixture with formic acid are produced in many important processes of the chemical industry. For example, mixtures consisting essentially of acetic acid containing formic acid as an undesirable impurity, are obtained in the oxidation of acetaldehyde; the oxidation with molecular oxygen of alkylaromatics, as in the oxidation of alkylbenzenes to phthalic acids in an acetic acid containing reaction medium; etc. Such mixtures may contain varying amounts of water and at times lesser amounts of other organic impurities. Efficient operation of processes wherein such formic acid-contaminated acetic acid is produced often necessitates the recovery of the acetic acid in a form containing no substantial amount of formic acid. Generally execution of the process in a manner commensurate with practical-scale operation is dependent upon the ability to return to the reaction zone acetic acid which contains no formic acid, or which contains only a predetermined, controlled relatively small amount of the lower boiling acid.

Separation between acetic and formic acids, especially in the presence of water, in ordinary practical-scale distillation means often presents considerable difficulty. Therefore, processes have been advanced directed to the removal of the formic acid by other means such as, for example, selective decomposition. These methods, however, often prove to be relatively costly and difficult to carry out without loss of a substantial amount of the desired acetic acid. A particular disadvantage inherent therein is the loss of the formic acid.

Methods have been disclosed heretofore wherein formic acid is separated from mixtures comprising formic and acetic acids by azeotropic distillation in the presence of a suitable azeotroping agent. Such methods are described for example in U.S. Patent 1,813,636 and in British specification 727,078. A disadvantage of such processes resides in the fact that they necessitate the use of fractionating columns having high separating efficiencies. In addition, since water-containing mixtures of acetic and formic acids are very corrosive at the temperatures employed in such operations the apparatus employed generally must be of a relatively costly non-corrosive material.

It has now been found that acetic acid, free of any substantial amount of formic acid, is separated from mixtures containing acetic acid in admixture with formic acid by extracting the mixture with an aromatic hydrocarbon solvent flowing countercurrently to a stream of aqueous solvent at temperatures in the range of from about 10° to about 45° C., and preferably from about 20° to about 35° C.

The relatively low temperatures at which the process of the invention is carried out thus obviate the need to resort to the use of the costly non-corrosive materials of construction of necessity required when effecting the separation by means of extractive distillation. A particular advantage of the process of the invention resides in its ability to effect the removal of the formic acid from the acetic acid in a manner enabling the recovery of the formic acid as a valuable product.

Mixtures consisting essentially of formic acid-contaminated acetic acid treated in accordance with the invention may be obtained from any suitable source. They include the commercially available mixtures of this type. The invention is not limited with respect to the formic acid content of the mixtures treated. It may be applied, for example, to the treatment of formic acid-contaminated acetic acids containing from about a fraction of a percent to about 35% and more of formic acid. A particular advantage of the invention, however, resides in its ability to effect the efficient removal of even relatively small, contaminating amounts of formic acid from acetic acid. The process is of value in removing, or reducing, the formic acid content of the acetic acid recycled in processes wherein aromatic hydrocarbons are oxidized with molecular oxygen in an acetic acid medium.

In accordance with the process of the invention the mixture of acetic and formic acid charged to the process is introduced into a suitable extraction zone, for example, an extraction column at an intermediate point along the height thereof. An aromatic hydrocarbon solvent such as, for example, benzene, is introduced into the lower part of the column at a point below the introduction of the acid mixture. An aqueous solvent, for example, water, is introduced into the upper part of the column at a point above the introduction of the acid mixture to be separated. Contact of the acid mixture with benzene flowing countercurrently to water in the extraction column will result in the formation of a hydrocarbon phase consisting essentially of benzene and acetic acid which is taken from the upper part of the column, and an aqueous phase consisting essentially of water and formic acid which is taken from the lower part of the extraction column.

The amount of aqueous and aromatic hydrocarbon solvent employed may vary within the scope of the invention. In general the introduction of an amount of water into the top of the column in the range of from about 0.1 to about 0.5 part by weight of water per part of total acid feed charged to the extraction has been found satisfactory. Under these conditions the amount of benzene charged to the column may suitably range from about 10 to about 20 parts by weight of benzene per part by weight of water employed as solvent. It is to be understood, however, that higher or lower amounts of the solvents may be employed within the scope of the invention.

Although benzene has been set forth as the preferred aromatic hydrocarbon solvent, other aromatic hydrocarbon solvents may be employed within the scope of the invention. Other suitable aromatic solvents include, for example, the alkylbenzenes, such as, toluene, xylene, etc.

When the charge to the system contains water in addition to the acid components to be separated, the amount of water separately introduced into the column may be reduced proportionately. When the charge contains a sufficient amount of water, for example, in excess of about 20% by weight based upon the total aqueous charge then the separation may be accomplished by direct extraction with the aromatic solvent in the absence of any further addition of aqueous solvent. In such case the aqueous acid mixture, containing in excess of 20% by weight of water, is introduced into the upper part of the extratcion column and the aromatic hydrocarbon solvent in to the lower part thereof.

Under the above-defined conditions the obtaining of an acetic acid containing no more than 0.01% formic acid, and even less, from acetic acid-formic acid-containing mixtures is brought about efficiently with the aid of conventional practical-scale equipment.

Separation of the acetic acid from the hydrocarbon phase, and of the formic acid from the aqueous phase, produced in the process is carried out by conventional means involving one or more such steps as, for example, distillation, evaporation, and the like.

*Example I*

A mixture of acetic and formic acids containing 80% acetic acid, 3% formic acid, and 17% water by weight, was fed into an extraction column having the equivalent of 7 ideal stages, at 30° C. (The feed was obtained by condensing vapors vented from a reactor in which p-diisopropylbenzene was being oxidized with molecular oxygen to terephthalic acid.) The point of feed introduction into the extraction column was so situated that the portion of the column above the feed inlet was equivalent to 1 ideal (washing) stage and the part below the feed inlet was equivalent to 6 ideal (extraction) stages. Into the top of the column there was introduced 0.1 part by weight of water for each part by weight of acid mixture fed to the column. Into the lower part of the column there was introduced 5 parts of benzene for each part of acid mixture fed to the column. From the top of the column there was withdrawn a benzene phase containing approximately 1% by weight of water which phase contained 97% of the acetic acid entering the column. The formic acid content of the phase so withdrawn from the upper part of the column was less than about 0.01% by weight of the acetic acid component thereof. An aqueous phase containing the remainder of the acetic acid and formic acid charged to the column was withdrawn from the lower part of the column. The benzene and water were removed from the benzene phase by evaporation, leaving the acetic acid.

It is, of course, possible to recover more than 97% of the acetic acid charged to the column by increasing the number of ideal extraction stages. Increasing the number of ideal washing stages therewith will prevent any increase in the amount of formic acid going into the overhead phase.

The process of the invention lends itself particularly well to execution in combination with the process for the production of terephthalic acid by the oxidation, with molecular oxygen, of p-diisopropylbenzene in an acetic acid-containing reaction medium as described and claimed in co-pending application Serial No. 599,311, filed July 23, 1956, now abandoned. In this combination the vapors vented from the oxidation reactor are condensed to result in an aqueous mixture comprising acetic acid and by-product formic acid. The acetic acid is recovered from the aqueous acid mixture by extraction with benzene flowing countercurrent to water as described above. The benzene is separated by evaporation from the hydrocarbon phase formed in the extraction, and the acetic acid so obtained returned continuously to the reaction zone. In such combination operation the formic acid content of the reaction mixture in the oxidation reactor is readily maintained within the limited range permitting efficient operation of the oxidation process.

Application of the invention to the extraction of a feed which contains so much water that it is unnecessary to feed additional water to the extraction column is illustrated by the following example.

*Example II*

An aqueous acid mixture containing 72% acetic acid, 4% formic acid and 24% by weight water, was introduced at 30° C., into the top of an extraction column having the equivalent of 10 theoretical extraction stages. Three parts by weight of benzene per part by weight of acid feed were introduced into the bottom of this column. From the top of the column there was withdrawn a benzene phase which contained 1.5% by weight of water and approximately 98% of the acetic acid charged to the extraction. The formic acid content of the acetic acid-benzene phase so withdrawn from the top of the column was 0.02% based on the acetic acid content thereof. An aqueous phase was withdrawn from the bottom of the column containing the remainder of the formic acid and acetic acid present in the feed to the column. Acetic acid was separated from the overhead phase by evaporating off benzene and water.

The invention claimed is:

1. The process for the resolution of a mixture consisting essentially of acetic acid and formic acid, which comprises extracting said mixture with benzene flowing countercurrently to a stream of water at a temperature of from about 10 to about 45° C., thereby forming a benzene phase containing benzene and acetic acid and a water phase consisting of water and formic acid, and recovering acetic acid from said benzene phase by distillation.

2. The process for resolving a mixture consisting essentially of acetic acid in admixture with formic acid, which comprises extracting said mixture with benzene flowing countercurrently to a stream of water at a temperature of from about 20° to about 35° C., employing from about 0.1 to about 0.5 part by weight of water per part by weight of said acid mixture and from about 10 to about 20 parts by weight of benzene per part by weight of water, thereby forming a benzene phase consisting essentially of benzene and acetic acid and a water phase consisting essentially of water and formic acid, and separating acetic acid from said benzene phase by distillation.

3. The process for the resolution of a mixture consisting essentially of acetic acid, formic acid and water containing at least about 20% of water, which comprises extracting said mixture countercurrently with benzene at a temperature of from about 10° to about 45° C., thereby forming a benzene phase consisting essentially of benzene and acetic acid and an aqueous phase consisting essentially of water and formic acid, and separating acetic acid from said benzene phase by distillation.

References Cited in the file of this patent

UNITED STATES PATENTS

| | | |
|---|---|---|
| 2,861,923 | Elce et al. | Nov. 25, 1958 |
| 2,953,501 | Mignone | Sept. 20, 1960 |

OTHER REFERENCES

Seidell: "Solubilities of Organic Compounds," 3rd ed., vol. II, 1941, pp. 28, 30 and 106–112.

Sato et al.: J. Biol. Chem., 170, 501–507 (1947).

Scheibel: Chem. Eng. Progr., 44, 681–690 (1948).

Scheibel: Chem. Eng. Progr., 44, 771–782 (1948).

Weissberger: "Technique of Organic Chemistry," vol. III (Part I, "Separation and Purification," 1956), 1956, pp. 150–168 and 197–310.